No. 666,303. Patented Jan. 22, 1901.
G. H. CONDICT.
STORAGE BATTERY TRANSFER CAR.
(Application filed Sept. 3, 1898. Renewed June 28, 1900.)
(No Model.) 3 Sheets—Sheet 1.
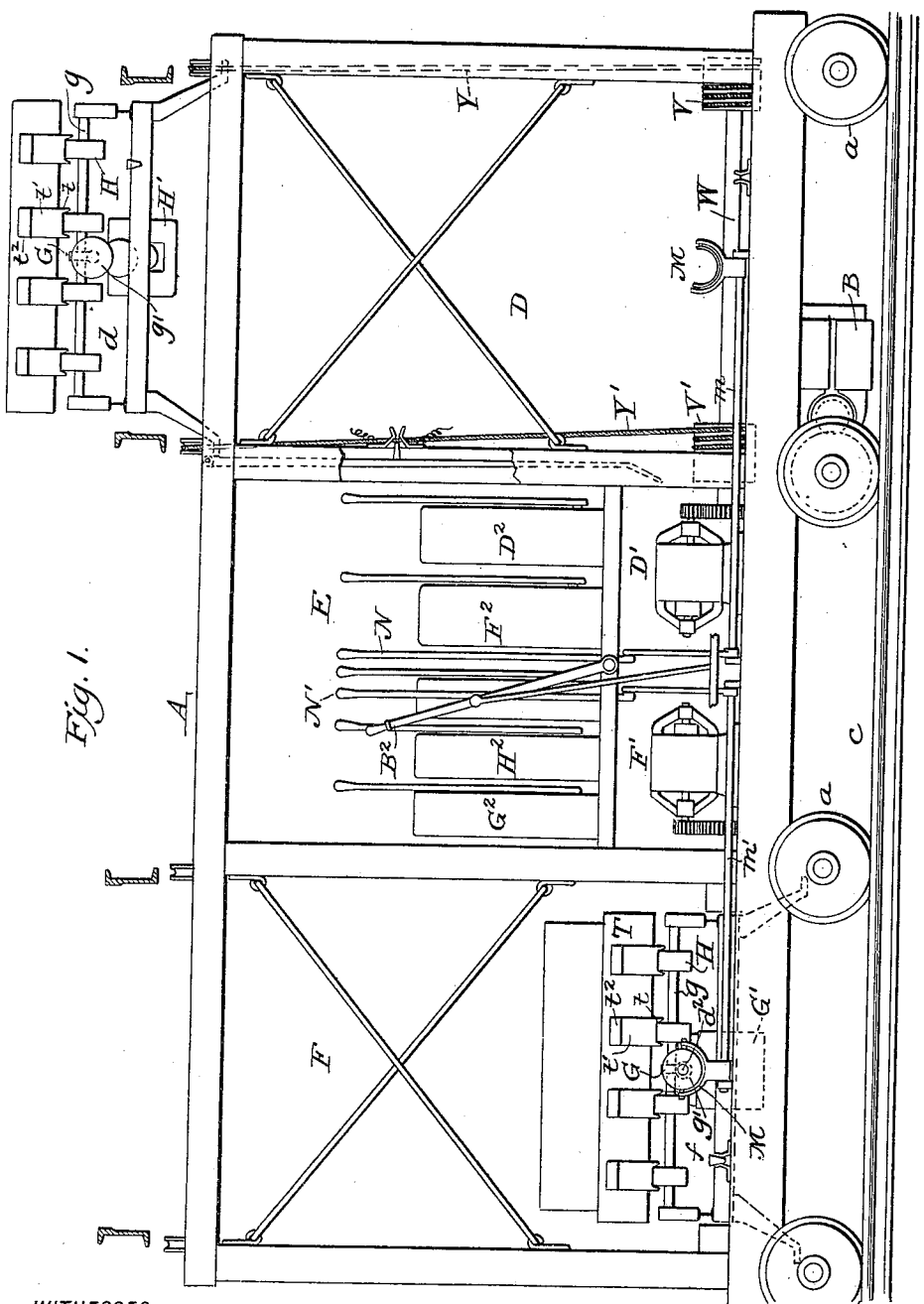
WITNESSES
James F. Duhamel
F. Horkimer
INVENTOR,
George Herbert Condict,
BY
Frankland James
ATTORNEY

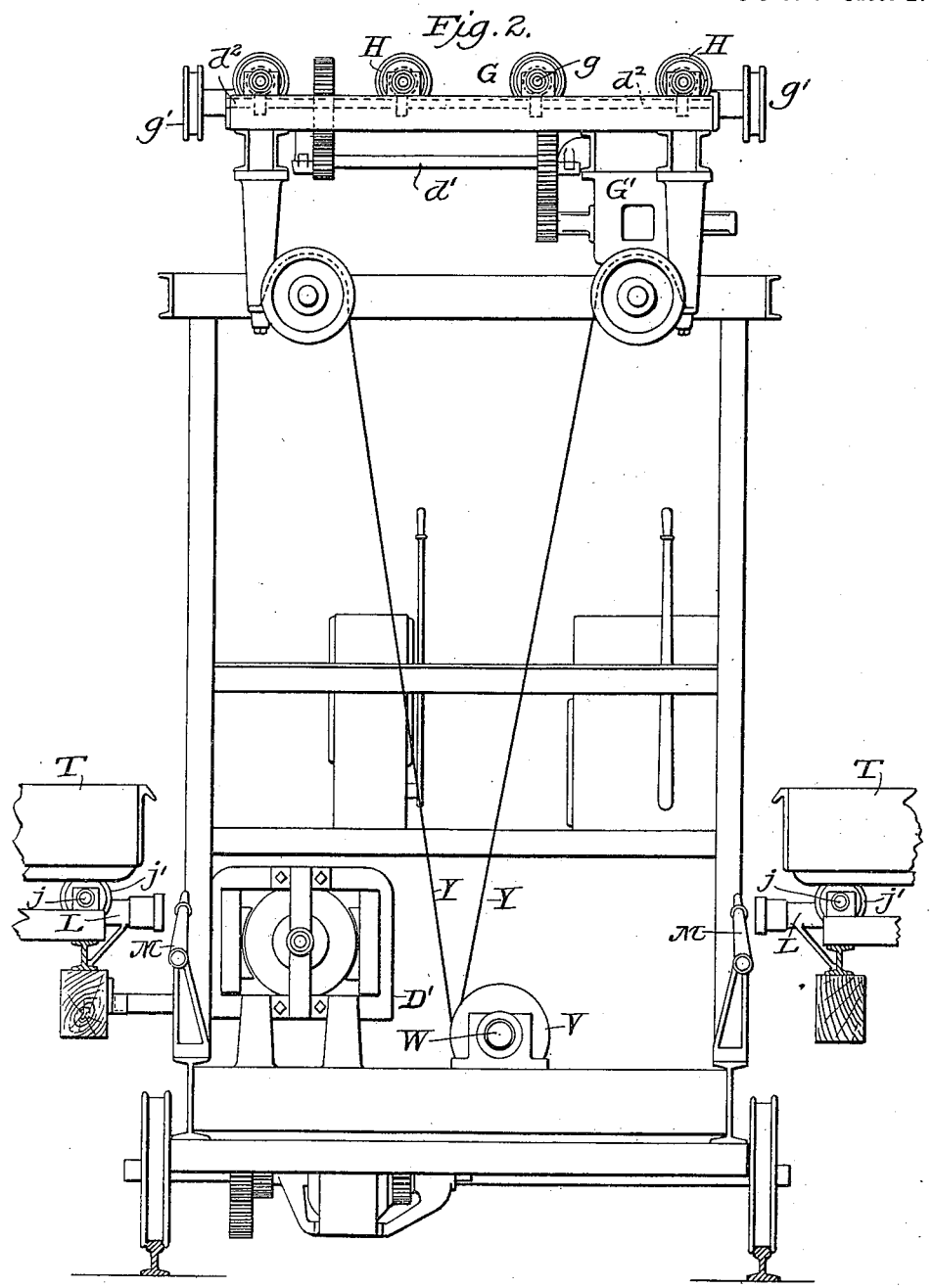

No. 666,303. Patented Jan. 22, 1901.
G. H. CONDICT.
STORAGE BATTERY TRANSFER CAR.
(Application filed Sept. 3, 1898. Renewed June 28, 1900.)
(No Model.) 3 Sheets—Sheet 3.
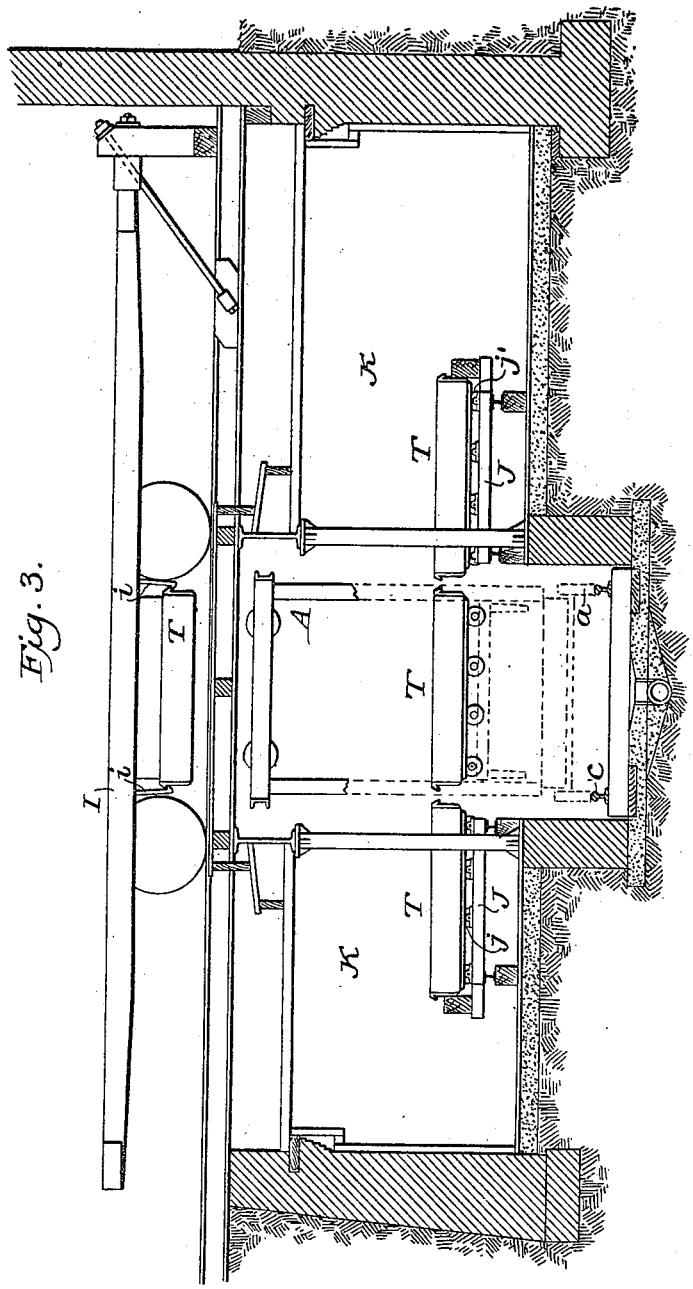
WITNESSES
James F. Duhamel
F. Hoskimer
INVENTOR,
George Herbert Condict,
BY
Frankland James.
ATTORNEY

UNITED STATES PATENT OFFICE.

GEORGE HERBERT CONDICT, OF NEW YORK, N. Y., ASSIGNOR TO THE ELECTRIC VEHICLE COMPANY, OF SAME PLACE.

STORAGE-BATTERY-TRANSFER CAR.

SPECIFICATION forming part of Letters Patent No. 666,303, dated January 22, 1901.

Application filed September 3, 1898. Renewed June 28, 1900. Serial No. 22,007. (No model.)

*To all whom it may concern:*

Be it known that I, GEORGE HERBERT CONDICT, a citizen of the United States of America, and a resident of New York, in the county of New York and State of New York, have invented certain new and useful Improvements in Storage-Battery-Transfer Cars, of which the following is a specification.

My invention relates to improvements in connection with storage batteries for the propulsion of electric-motor cars and other vehicles, and is particularly directed to facilitating the handling and moving of heavy trays of storage batteries in applying them to the vehicles to which they are to supply current for propulsion and also in removing them from said motor cars and vehicles and transferring them (the batteries) to and from the places where they are charged.

In carrying out my invention I provide a space or chamber beneath the track or way on which the motor car or vehicle to be supplied with batteries is operated. This space or chamber I have called the "charging-pit." Another track is placed in the charging-pit, upon which travels the battery-transfer car. The batteries to be charged are placed in trays upon stationary platforms on one or both sides of the track. The battery-transfer car is preferably provided with two elevators and means for propelling the car back and forth. Each elevator is provided with a number of rotatable shafts, each carrying rollers, said shafts being all connected by gearing to a main shaft which is operated by a separate motor connected with each elevator and controlled from a central point from which the attendant controls all the motors upon and connected with the transfer-car. The stationary charging-platforms are provided with rollers similar to those on the elevator-platform, and these are desirably located on both sides of the track of the transfer-car. The driving-shafts of the stationary charging-platforms extend close to the track, so that clutching devices connected with the driving-shafts upon the elevator-platforms may also engage the driving-shafts of the charging-platforms. When the main shaft of the charging-platform is connected with the driving-shaft on the elevator-platform and all the rollers on it are rotated in unison and in the same direction, a tray of batteries resting on said rollers can be readily run onto the elevator from the charging-platform or delivered from the elevator to the charging-platform, according to the direction of rotation of the rollers.

While I have in Figure 3 indicated an electric-motor car on a track above the charging-pit in position to change batteries according to my invention, it must be understood that the invention is not thereby limited to vehicles running upon tracks, as it applies equally to any vehicles which are arranged to receive their batteries from below and provided with means for supporting them in such position, and in referring to the vehicles as "motor-cars" I do not in any way limit myself to such vehicles specifically.

The cars to receive the batteries are run upon tracks passing over the charging-chamber and in such position that the elevator can come up under them to place or remove the tray of batteries, which by appropriate movements of the elevator-car can be taken from or delivered to any one of the charging-stands on either side of the charging-room.

In operation when a motor-car is in position for change of battery a tray of charged batteries is taken onto the rear elevator and the transfer-car run up with its front elevator under the motor-car. The said front elevator is then raised into contact with the battery on the car and its securing devices are loosened and the elevator descends, carrying the spent battery with it. The transfer-car is then moved up until the charged battery is below the motor-car, when the second elevator is caused to ascend and the battery is placed in position, as set forth in my application for Letters Patent filed July 30, 1898, Serial No. 687,248. The transfer-car is then run back into the charging-room until the elevator carrying the spent battery comes opposite a vacant charging-platform, when the driving-shafts of the two platforms are connected by the clutch, the motor upon the elevator is started, and the spent battery is run from the elevator onto the charging-platform.

The invention is capable of being carried into effect through a variety of constructions which may vary in many minor details. I therefore do not limit myself to the actual construction shown and described, although the same is in many respects desirable, but broadly claim the method of changing batteries by means of a motor car or cars having an elevator or elevators and operating upon a track below the track upon which is a motor-car to be supplied.

In the accompanying drawings, Fig. 1 is a side elevation of the battery-transfer car, one of the elevators being raised and the other lowered. Fig. 2 is an end view of the apparatus shown in Fig. 1. Fig. 3 is an end elevation on a reduced scale, showing the battery-room or charging-chamber and indicating the battery-transfer car, together with a motor-car in position.

As shown in Fig. 1, A is the battery-transfer car, which is a structure mounted upon wheels $a$ and provided with a motor or motors B for propelling it on its track C in the battery-charging room or pit. The structure of the battery-transfer car A is divided into three portions D E F. The compartments D F contain vertically-moving elevators $d$ $f$, which are provided with transverse shafts $g$, carrying rollers H. Beveled or worm gears G are also provided upon the shafts $g$, and an intersecting driving-shaft $d'$ is also journaled upon the elevator and provided with gears which mesh with the gears upon the shaft $g$, and when rotated by power they all turn simultaneously in the same direction.

Each elevator-platform is provided with a motor G' H', the armature-shafts of which are geared to the counter-shafts $d'$, that are in turn geared to the main driving-shafts $d^2$, which are connected by the bevel-gear with the roller-carrying shafts $g$ on each elevator.

The storage batteries, the handling of which is the object of this invention, are arranged in similar groups, each group in a tray T, which trays are all of substantially the same exterior dimensions. These trays T are strengthened, supported, and in a measure held together by bars $t$, of channel-iron, which are secured transversely to the bottom of said trays, with the ends $t'$ of the channel-iron bars turned up at the side of the trays and formed into hooks $t^2$, by which they are suspended in position on the motor-car by movable links $i$ $i$ or equivalent means or as set forth in my prior application, filed July 30, 1898, Serial No. 687,248.

The central compartment E of the car A contains two motors D' F', one for operating each of the elevators, together with controlling-stands D² F², containing the electrical appliances for starting, stopping, reversing, and graduating the speed of the aforesaid motors, whereby the elevator-platforms and the trays of batteries thereon are raised and lowered to attach or detach the same to and from the motor-cars I, one of which is indicated in position in Fig. 3.

The charging room or pit K K, which is below the track upon which the motor-cars are supplied, preferably extends on each side of the track C, upon which the transfer-car moves. In this charging-room are arranged a series of platforms J J, each provided with shafts $j$ and rollers $j'$, as are the elevator-platforms $d$ $f$, and they are each provided with a central shaft L for operating these rollers, and the ends of these shafts extend toward the central track and are fitted to engage the clutches $g'$, which are attached to each end of the shafts upon the elevator-platform and engage a shipping-collar M when in their lowered position. When so lowered the collars are operated through shafts $m$ $m'$ and lever N N' in the cab, so that either of the shafts of the charging-platforms can be connected with one or other of the driving-shafts on the elevator-platforms and be rotated thereby. The channel-irons on bottom of trays correspond in space and width with the rollers H, and therefore form both guide and tracks to insure proper travel of the trays.

The transfer-car, with its two elevators lowered, is stopped with one of its elevator-platforms opposite a stationary platform in the charging-room upon which is a tray of charged batteries. The clutch is operated to connect the driving-shaft upon the elevator-platform with the driving-shaft of the stationary or charging platform. The motor upon the elevator being put in motion, both shafts are turned as one, together with all of the rollers upon the elevator-platform and on the stationary platform, and the tray of batteries is carried by the turning rollers from the stationary to the elevator platform. The clutch M is then opened, the elevator brought into position under the motor-car to be loaded, and the battery raised and attached to the motor car or vehicle. The operation of removing an exhausted battery from the car is the same reversed, and it is usual to have one elevator loaded with a tray of charged batteries and the other empty. Then the first operation is for the forward empty elevator to ascend and detach and remove the spent batteries, after which the transfer-car moves up and the charged batteries are put in place, after which the motor-car is ready to resume operation, and the transfer-car is run back into the charging-room, coupled up to an empty charging-platform, onto which it discharges the tray just removed from the motor-car, and takes up another charged tray ready to repeat the operation.

Having described my invention, what I claim is—

1. The combination in a vehicle-battery-charging apparatus, a traveling elevator, a charging-stand flanking the same, means for transferring batteries from the stand to the elevator and for operating the elevator and means depending from the vehicle for securing the battery thereto.

2. In combination, a motor-vehicle, a storage battery therefor arranged to be attached thereto by members depending from the vehicle and suitable apparatus for lifting said battery into suspended engagement with the depending parts.

3. In combination, a motor-vehicle, a storage battery, a battery-charging platform, an elevator and mechanism for transferring the storage battery between said elevator and charging-platform and for elevating the battery into its operating position on the motor-car from beneath and means connected with the car for sustaining the battery in suspended engagement therewith.

4. A battery-transfer car comprising a controllably-propelled vehicle, two separately-controlled elevators carried by said vehicle, one for removing the spent battery from a motor-vehicle located above the transfer-car, and the other for supplying a charged battery thereto by lifting it into engagement therewith and means also carried by the transfer-car for actuating the mechanism and for controlling the operation of the car and of the elevators.

5. A battery-transfer car comprising a wheeled vehicle, a motor for propelling the same and means for operating the motor of the propelled vehicle, two elevators carried by the vehicle and separate means for raising and lowering the same, a motor-vehicle adapted to receive a tray of batteries from below when raised into position by the elevator and means carried by the motor-vehicle for sustaining the tray of batteries in suspended engagement therewith when raised into operative connection therewith.

6. A battery-transfer car comprising a controllably-propelled vehicle having two elevators for removing a spent battery and for supplying a charged battery to a motor-vehicle and means for operating and controlling the movements of the transfer-car and of each of the elevators independently, in combination with charging-platforms arranged adjacent to the line of travel of the elevator-car, mechanism upon said charging-platforms for moving a tray of batteries horizontally, mechanism upon the elevator-platforms operating in connection therewith, a clutch mechanism for connecting the two and a motor connected with the elevator for operating the combined mechanism to move a battery onto the elevator-platform or from the elevator-platform to the charging-platform.

7. The combination with charging-platforms having rollers upon which the tray of batteries to be charged rests, a battery-transfer car having an elevator-platform which is provided with rollers corresponding with those upon the charging-platforms, a clutch carried by the elevator for connecting the mechanism of the charging and elevating platforms and a motor upon the elevator operating the connected mechanisms simultaneously to move a tray of batteries from the charging-platform to the elevator-platform or vice versa.

8. The combination with a charging-platform having a series of mechanically-rotatable rollers, arranged in rows, a tray adapted to contain batteries to be charged upon said platform and provided with flanged strengthening ribs or pieces at its under side corresponding with the rows of rollers and adapted to rest thereon and sustain and guide the tray.

9. The combination with a charging-platform having series of mechanically-rotatable rollers arranged in rows, a movable elevator-platform having corresponding rollers, a clutch or connection for the driving mechanism of the rollers upon the elevator and charging platform, and a motor for simultaneously operating both sets of rollers and a tray provided with double-flanged track-irons at its under side, said irons being spaced to correspond with the rows of rollers and adapted to sustain and guide the tray in its travel upon the rollers.

Signed by me at New York, N. Y., this 2d day of September, 1898.

GEORGE HERBERT CONDICT.

Witnesses:
FRANKLAND JANNUS,
CHAS. E. DUROSS.